(12) United States Patent
Gabara et al.

(10) Patent No.: US 8,451,118 B2
(45) Date of Patent: May 28, 2013

(54) METHOD AND APPARATUS FOR MAINTAINING AND LOCATING LOST, MISPLACED OR STOLEN ARTICLES

(75) Inventors: Quinton Andrew Gabara, Murray Hill, NJ (US); Thaddeus John Gabara, Murray Hill, NJ (US)

(73) Assignee: TrackThings LLC, Murray Hill, NJ (US)

( * ) Notice: Subject to any disclaimer, the term of this patent is extended or adjusted under 35 U.S.C. 154(b) by 321 days.

(21) Appl. No.: 12/695,176

(22) Filed: Jan. 28, 2010

(65) Prior Publication Data

US 2011/0181415 A1 Jul. 28, 2011

(51) Int. Cl.
| G08B 13/14 | (2006.01) |
| G08B 1/08 | (2006.01) |
| G05B 19/00 | (2006.01) |
| H04W 40/00 | (2009.01) |
| H04M 3/16 | (2006.01) |
| G06Q 30/00 | (2006.01) |
| G06Q 20/00 | (2012.01) |

(52) U.S. Cl.
USPC .............. 340/568.1; 340/568.5; 340/572.1; 340/5.92; 340/593.21; 340/539.11; 455/446; 455/411; 705/26.1; 705/23; 705/16

(58) Field of Classification Search
USPC ............. 340/539.32, 539.1, 539.11, 539.13, 340/539.25, 825.69, 568.1, 539.23, 572.1, 340/5.61, 568.8, 571, 539, 572.3; 455/574, 455/410, 411; 381/56–57, 77–79, 111, 124; 348/143, 152; 705/26, 23, 16
See application file for complete search history.

(56) References Cited

U.S. PATENT DOCUMENTS

| 5,748,085 | A * | 5/1998 | Davis et al. ................. 340/572.1 |
| 2002/0050928 | A1* | 5/2002 | Olsen et al. ................. 340/568.1 |
| 2004/0178907 | A1* | 9/2004 | Cordoba .................. 340/539.21 |
| 2005/0040934 | A1* | 2/2005 | Shanton ........................ 340/5.92 |
| 2006/0267575 | A1* | 11/2006 | Sampson et al. .............. 324/110 |
| 2007/0099623 | A1* | 5/2007 | Stephensen et al. .......... 455/446 |
| 2007/0140644 | A1 | 6/2007 | Gabara |
| 2008/0001747 | A1* | 1/2008 | Kangas ....................... 340/572.1 |
| 2008/0074260 | A1* | 3/2008 | Reiner ........................ 340/568.5 |
| 2008/0112591 | A1 | 5/2008 | Gabara |
| 2008/0112598 | A1 | 5/2008 | Gabara |
| 2008/0180244 | A1* | 7/2008 | Howarth et al. ........... 340/568.1 |
| 2008/0275791 | A1* | 11/2008 | Youssef et al. ................. 705/26 |
| 2009/0315714 | A1* | 12/2009 | Sher ........................... 340/568.1 |

OTHER PUBLICATIONS

U.S. retailers continue struggle with employee theft, Reuters, Fri Jul. 10, 2009 http://www.reuters.com/article/idUSTRE56957N20090710, Jan. 27, 2010.

\* cited by examiner

*Primary Examiner* — Jennifer Mehmood
*Assistant Examiner* — Mirza Alam
(74) *Attorney, Agent, or Firm* — Thaddeus Gabara; Tyrean Patent Prosecution Law Firm

(57) ABSTRACT

Theft increases the average product cost to consumers. A mentoring system is presented that can help to reduce or prevent the inventory from lost or theft. Theft is a serious concern in the consumer market place. Industry loses billions per year on theft of merchandise. According to a Reuters report, last year, thefts by employees of U.S. retail merchandise accounted for $15.9 billion, or 44 percent of theft losses at stores, more than shoplifting and vendor fraud combined. Thus,total thief by the customers and store employees during the year 2008 amounted to $36 billion. Several embodiments of ways to control or reduce the thefts in the market place are presented.

18 Claims, 13 Drawing Sheets

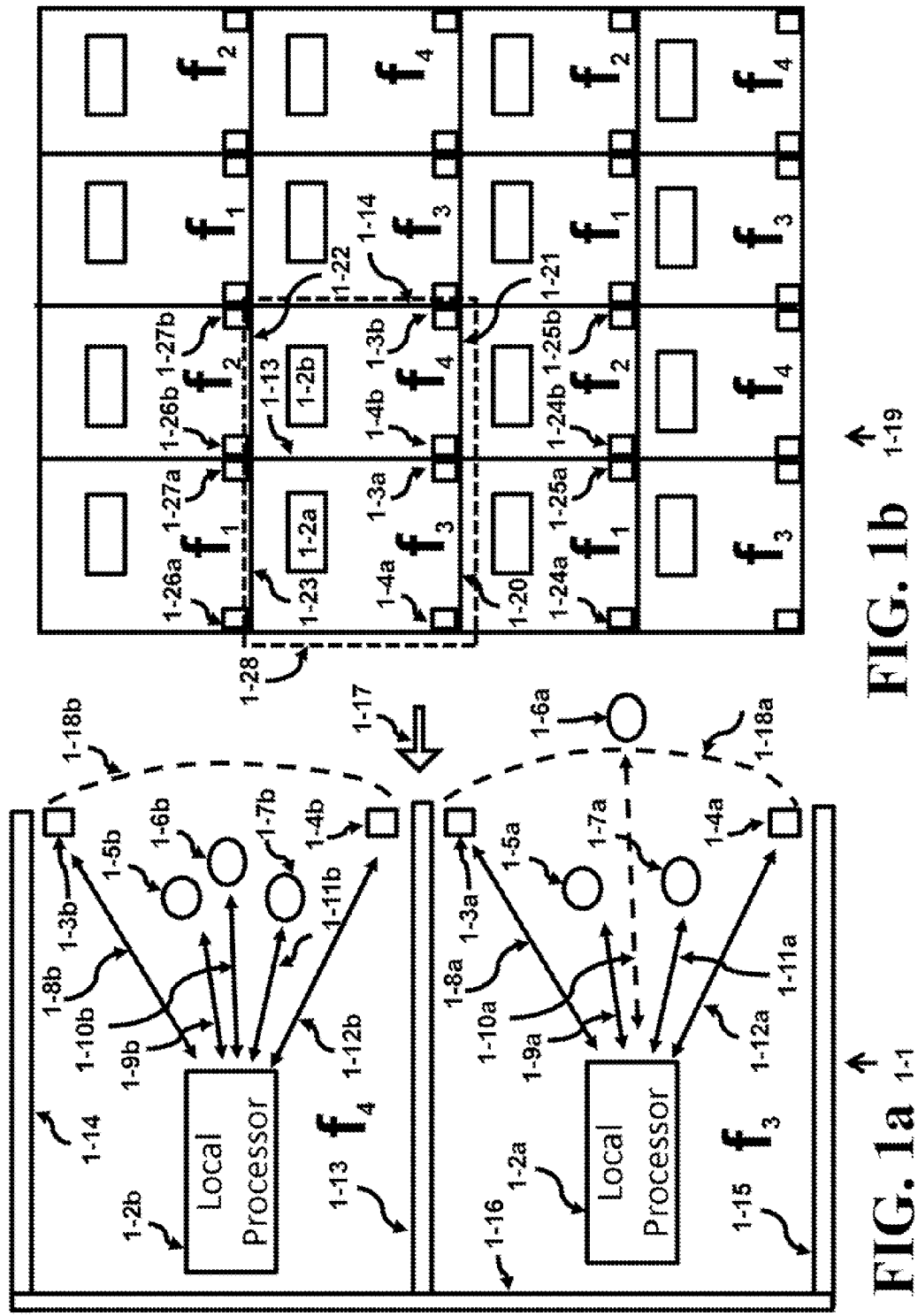

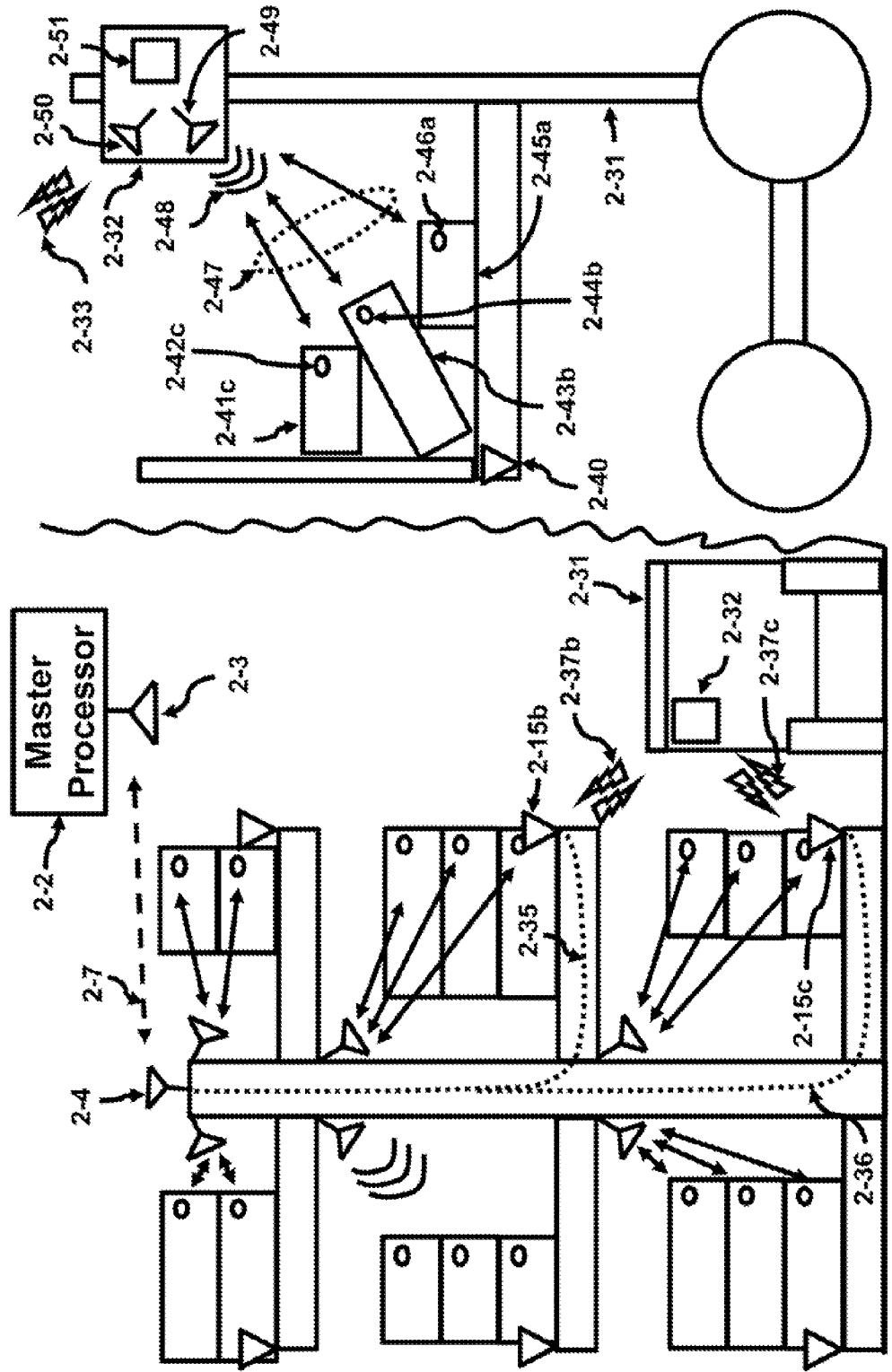

METHOD AND APPARATUS FOR MAINTAINING AND LOCATING LOST, MISPLACED OR STOLEN ARTICLES

BACKGROUND OF THE INVENTION

Theft in stores increases the average product cost to consumers. To get the costs under control, this invention proposes a mentoring system that can help to reduce or prevent the inventory from lost or theft.

BRIEF SUMMARY OF THE INVENTION

Theft is a serious concern in the consumer market place. Industry loses billions per year on theft of merchandise. The thief during the year 2008 amounted to $36 billion and is due to both the theft by the customers and store employees, as well. Last year, thefts by employees of U.S. retail merchandise accounted for $15.9 billion, or 44 percent of theft losses at stores, more than shoplifting and vendor fraud combined. Several embodiments of ways to control or reduce the thefts in the market place is presented.

BRIEF DESCRIPTION OF THE DRAWINGS

Please note that the drawings shown in this specification may not be drawn to scale and the relative dimensions of various elements in the diagrams are depicted schematically and not necessary to scale.

FIG. 1a shows a local processor in wireless contact with components and reference blocks within a shelf illustrating this inventive technique.

FIG. 1b illustrates the different frequency bands used in each shelf to minimize interference between adjacent local processor illustrating this inventive technique with reference blocks.

FIG. 2b depicts another variation of the aisle view of a store with shelves of products and the carriage using this inventive technique.

FIG. 2c illustrates a side view of the carriage containing several products in wireless contact with the system to provide a location using this inventive technique.

DETAILED DESCRIPTION OF THE INVENTION

Figures 1C, 1D:
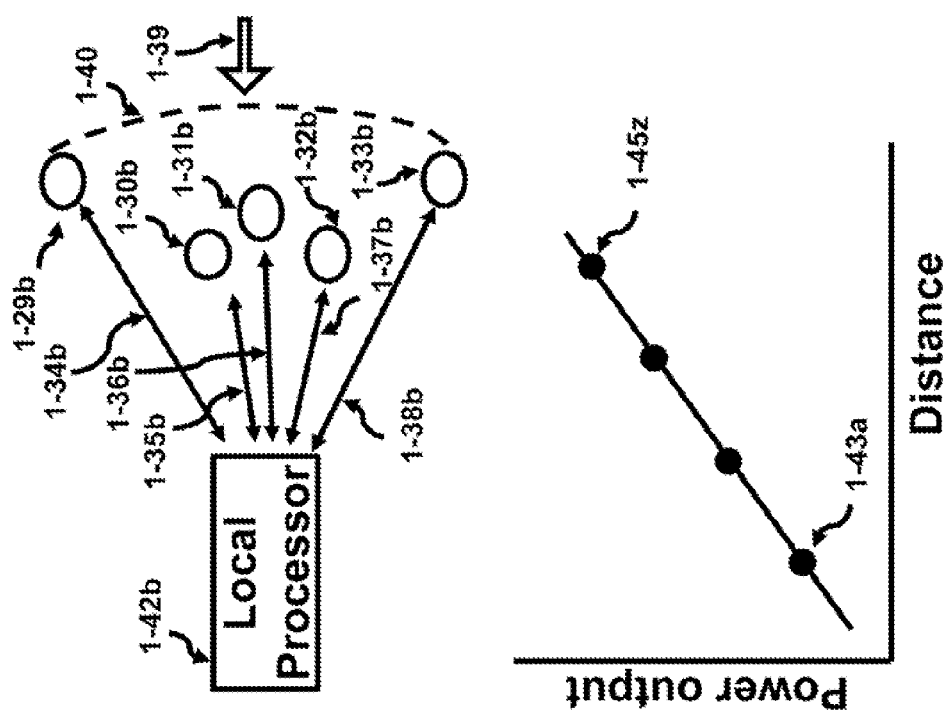
FIG. 1c depicts the local processor in wireless contact with the master processor and components where an output power based on distance is restricted illustrating this inventive technique.
FIG. 1d shows the different frequency bands used in each shelf to minimize interference between adjacent local processor illustrating this inventive technique without reference blocks.

Packages or components can be monitored as they are transported from one location to another. The monitoring is controlled by a master processor and can be performed automatically. The system senses the movement of a component, identifies the location of the component, follows the component and determines if component has been purchased. If the component has not been purchased, then an alarm is registered so security can follow up on the status of the component.

This inventive technique utilizes ways to minimize power dissipation within a cell, position cells of different spectrums of energy in adjacent cells, minimize interference between cells, regulate the size of these cells, determine when a component leaves the boundary of the cell, follow component once it is outside of the cell. The cell defines a volume of space, for example, a shelf that has a top, bottom, sides, and back physical partitions is one possibility of defining the volume that describes the cell. The cell dimensions can be adjusted in part by varying the output power of a local processor which is associated with a shelf.

Every package on a shelf contains a component. The component can be attached, glued, placed inside, or be a part of the actual package. The package contains the item that the customer desires to purchase. If every package contains a component, the component becomes synonymous with the package. Thus, following the component insures that the package is followed. Thus, this specification will use the term component to imply the package as well. The component and local processor are comprised of electronics, antennas, power source and power storage and each can be used to form communication links. Some of the electronics can be incorporated into an integrated circuit. If the dimension of the antenna exceeds the area of the integrated circuit, then the antenna can be connected to the integrated circuit as a separate unit. One link is formed between each of the components on a shelf and the local processor. The discussions that follow will seek ways to identify the location of a package (component), power the components, communicate with the component and follow the component. These techniques are applicable to both the employee and the customer.

FIG. 1a illustrates a top view 1-1 of a shelf that is partitioned into two sections. The arrow 1-17 shows the front perspective provided in FIG. 1b where the two sections are within the dashed rectangle 1-28. Back to FIG. 1a, the sections are segregated by physical barriers; the lower section is segregated from the upper section by the side 1-13. The sides 1-14 and 1-15 segregate these two sections from other sections. These two sections also share the back walls or barrier 1-16.

The top local processor 1-2b communicates to components 1-5b through 1-7b using the wireless links 1-9b through 1-11b. Each component, although not shown, has an antenna, internal circuitry, memory, control, as would be expected in one or more integrated circuits to enable communications and help determine relative position, as well as, performing any desired function that may be required. The same capability holds for the local processor and any other type of processor that may be discussed unless otherwise indicated. Each end of the link is coupled to an antenna of a transceiver that receives/generates the communication signal received from/to the link. Finally, although not shown, the local processors eventually communicate with the master processor. The master processor controls the overall operation of the system.

Two reference blocks 1-3*b* and 1-4*b* are wirelessly linked to the local processor 1-2*b* via links 1-8*b* and 1-12*b*, respectively. The reference blocks are used to set the "reference distance" from the transceiver. The reference blocks can be stationary and firmly held in place. If the reference blocks are stationary, a wired link can be used to carry power and a portion of the non-wireless signals to operate and control the circuits in the reference block. The reference block or blocks are approximately placed at a distance from the transceiver where the edge of the cell is desired. The reference blocks 1-3*b* and 1-4*b* measure the power intensity of the signal being emitted from the local processor 1-2*b*. Although two reference blocks have been illustrated, the number of reference blocks can vary and will depend on the requirements of the system. The links 1-8*b* and 1-12*b* relay a signal from the local processor to each of the reference block and back to the local processor. As this is occurring, the output power level of the transceiver in the local processor 1-2*b* is decreased until an acceptable bit error rate (BER) is achieved at the given distance at where the first reference block 1-3*b* is placed. This adjustment is also made between the transceiver in the local processor 1-2*b* and the second reference block 1-4*b*.

When an acceptable bit error rate is achieved, the two output power levels of the transceiver in the local processor are stored into a database. The maximum of the two power level values is noted and is called the "reference output power level." The local processor is set to output the "reference output power level" for that cell. The transceiver will provide reliable communication up to the bound 1-18*b*.

The bottom local processor 1-2*a* communicates to components 1-5*a* through 1-7*a* using the wireless links 1-9*a* through 1-11*a*. Two reference blocks 1-3*a* and 1-4*a* are wirelessly linked to the local processor via links 1-8*a* and 1-11*a*, respectively. The reference blocks are used to set the "reference distance" from the transceiver. The reference blocks 1-3*a* and 1-4*a* measure the power intensity of the signal being emitted from the local processor 1-2*a*. The links 1-8*a* and 1-12*a* relay a signal from the local processor to each of the reference block and back to the local processor. As this is occurring, the output power level of the transceiver in the local processor 1-2*a* is decreased until an acceptable bit error rate (BER) is achieved at the given distance at where the first reference block 1-3*a* is placed. This adjustment is also made between the transceiver in the local processor 1-2*a* and the second reference block 1-4*a*.

An acceptable BER will vary depending on the complexity of the system, noise in the system, interference, bit rate, attenuation, multipath fading, etc. Forward Error Correction (FEC) techniques and channel coding can be used to improve bit rate. When an acceptable bit error rate is achieved, the two output power levels of the transceiver in the local processor are stored into a database. The local processor 1-2*a* is set to output the maximum of the two values as the "reference output power level" for that cell. The transceiver will provide reliable communication up to the bound 1-18*a*.

Note that the frequency of the carrier is different for the two cells. The local processor 1-2*b* is operating at $f_4$, while the local processor 1-2*a* is operating at $f_3$. This avoids interference between the two cells if the radiation from an antenna from one cell spills into an adjacent cell since the carrier frequencies are different.

This is further depicted in one possible carrier frequency assignment illustrated in FIG. 1*b*. Note that the local processor 1-2*b* within the dashed rectangle 1-28 operates at $f_4$ while all adjacent cells operate at a different carrier frequency. The local processor 1-2*a* (adjacent to the left) operates at $f_3$, the local processor (not labeled and adjacent to the right) operates at $f_3$. The cell above and below the local processor 1-2*b* operate at the carrier frequency of $f_2$. The reference blocks 1-24*b* through 1-27*b* are depicted for these two cells. All four diagonal cells operate at $f_1$. The reference blocks 1-24*a* through 1-27*a* are illustrated for half of these cells. The shelves in FIG. 1*b* typically stock packages (or components), but have not been included to simply the diagram.

During power-up of each the components 1-5*a* through 1-7*a* and 1-5*b* through 1-7*b* for the first time, their output power level is reduced to the "reference output power level" value for that cell by attenuating the output signal of the component. Then, the link is checked by measuring the BER for the link in the path from the component to the local processor. This can be done when the shelves are initially stocked with new products. Positive or negative adjustments to the output power level can be made to achieve reliable BER measurements between all components in a cell to their corresponding local processor. This is called the "reference component output power level." The reference component output power level is also stored in an on-chip memory (where the memory is preferably a non-volatile memory) and in addition can be stored in the local and master processor's memory and the database. The component's characteristics; type of component, manufacturer, serial number, component name, date of manufacture, etc. are stored in the on-chip memory for access by the local or master processor. The local processor selects the maximum of the "reference component output power level" and programs all components in that cell to output the maximum level.

In the lower cell of F*ig*. 1*a*, the two reference blocks, for example 1-3*a* and 1-4*b*, were used to define a boundary between the shelf and the aisle. Once the component 1-6*a* has been moved to a location past the boundary 1-8*a*, the communication link 1-10*a* has been weaken to the point that either the local processor or the component 1-6*a* will eventually not recognize the existence of the other any longer. The local processor then informs a master processor of the missing component 1-6*a*. The master processor can now control monitoring the location of this component using a secondary monitoring system once the component is outside of its cell.

Depending on the size of the shelf, the number of reference blocks per shelf can be more or less than two. In some cases, the walls: the shelf, partition or back barrier between common shelves or supports can be formed of non-metallic material to extend the range of the transceivers in the local processor or components. Note that the modularity of the shelves in FIG. 1*b* can leads to variety of different sized cells. Simply by removing a side partition, or a barrier partition, the volume of the cell can be varied.

F*ig*. 1*c* depicts a local processor 1-42*b* with several components 1-29*b* through 1-33*b* communicating to the local processor 1-42*b* using links 1-34*b* through 1-38*b*. In this case, each component is set to one of a number of pre-defined output power levels (1-43*a* through 1-45*z*). From studies conducted on shelves, power levels are determined (see bottom of F*ig*. 1*c*) as a function of distance that provide acceptable BER within the volume of a cell but drops rapidly as the boundary 1-40 (see top of FIG. 1*c*) surrounding the cell is crossed. Once this database has been compiled, the components can be programmed with a specified output power level after they are placed on a shelf. The output power level of the transceiver in the local processor that couples to the links 1-34*b* through 1-38*b* is adjusted to relay a signal from the local processor to each of the components. The pre-programmed output power level of the return link has already been set as mentioned earlier. As this is occurring, the power level of the transceiver in the local processor is minimized until an acceptable bit error bit rate is achieved for the distance between the local processor and each of the components. The maximum of all the minimum values is selected and the transceiver in the local processor is set to this new maximum reference output power value. Once a component passes barrier 1-40 a signal is sent to the master processor to hand off to another monitoring system.

FIG. 1*c* also indicates the front view 1-39 perspective that will be shown in FIG. 1*d*. In FIG. 1*d*, the front view 1-46 of the shelves is illustrated. The local processor 1-42*b* is within the dashed rectangle 1-56. Note that in all adjacent shelves of shelf 1-55, 1-47 through 1-54 use a different carrier frequency for operation.

Figure 2A:
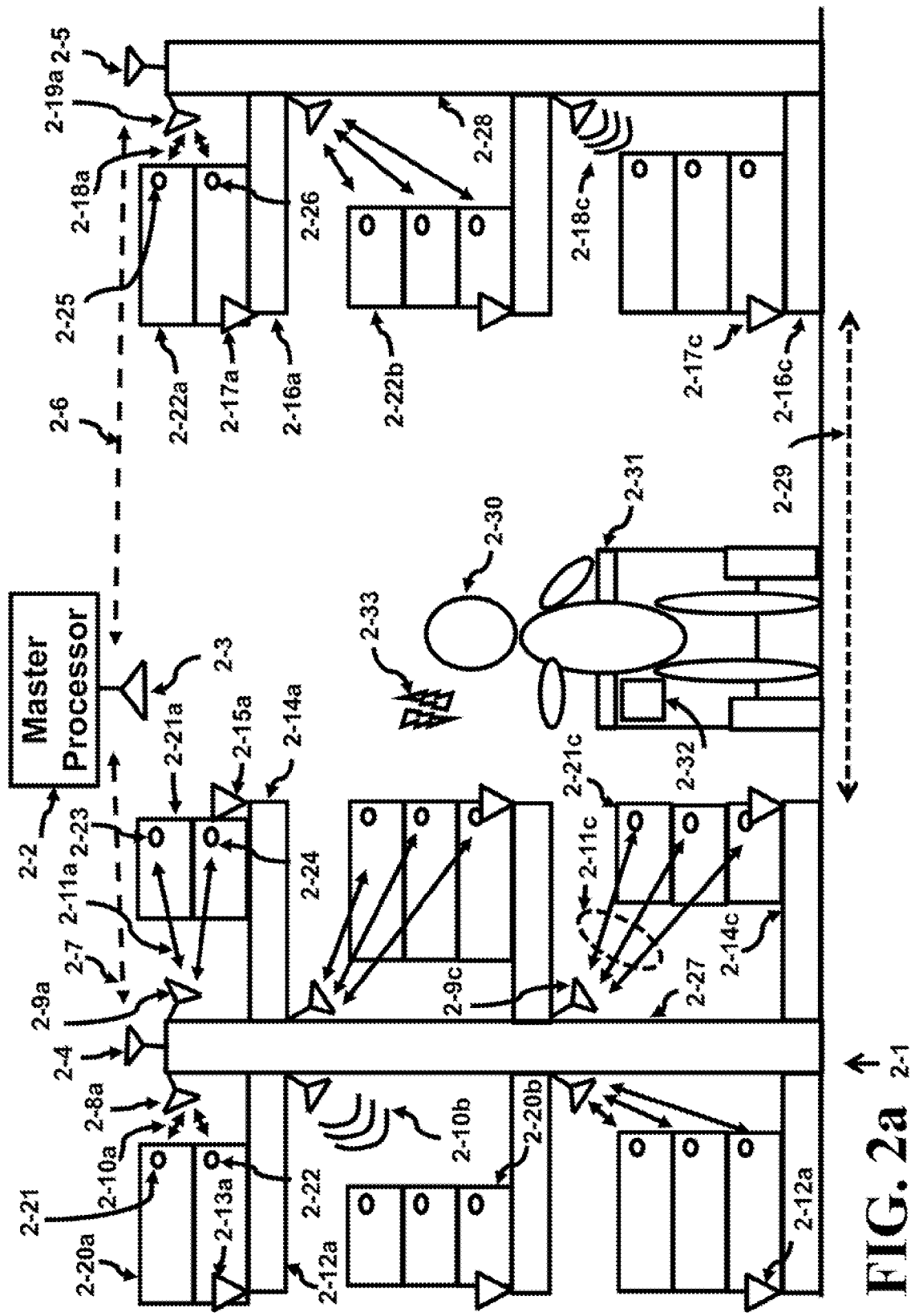
FIG. 2a shows an aisle view of the store with shelves of products and the carriage using this inventive technique.

FIG. 2*a* depicts a cross-sectional view 2-1 of a store defining the width 2-29 of an aisle and showing the shelves that face the second aisle to the left. These aisles go into the page. One aisle is formed between the locations of the two vertical supports 2-27 and 2-28 and the shelves 2-14*a* to 2-14*c* and 2-16*a* to 2-16*c* that are placed on the supports. Note that there are three layers of shelves, although the number of layers could be any number. To simplify the description, many parts on the upper shelf ends the identifiers with an "a", similar parts on the middle shelf end with "b" and those on the lowest shelf end in "c."

The upper set of shelves 2-12*a*, 2-14*a* and 2-16*a* has at least one stack of packages 2-20*a*, 2-21*a* and 2-22*a* on them, respectively.

Inside the stack of packages 2-20*a*, there two packages where the first package has component 2-21 and the second package has component 2-22. The components 2-21 and 2-22 communicate to the antenna 2-8*a* of the local processor using one of the links 2-10*a*. The component can be placed inside or mounted on the outside of the package. A reference block 2-13*a* is shown at the far end of the shelf 2-12*a*. The components can have a transceiver that can receive/transmit information from/to the local processor as mentioned earlier. In addition, all the local processors within a stack of shelves can be coupled to an antenna 2-4 of the stack processor that in turn communicates with the antenna 2-3 of the master processor 2-2 via the link 2-7. The antenna 2-5 of the stack processor communicates with the antenna 2-3 of the master processor 2-2 via the link 2-6.

Inside the stack of packages 2-21*a*, there two packages where the first package has component 2-23 and the second package has component 2-24. The components 2-23 and 2-24 communicate to the antenna 2-9*a* of the local processor using one of the links 2-11*a*. A reference block 2-15*a* is shown at the far end of the shelf 2-14*a*.

Inside the stack of packages 2-22*a*, there two packages where the first package has component 2-25 and the second package has component 2-26. The components 2-25 and 2-26 communicate to the antenna 2-19*a* of the local processor using one of the links 2-18*a*. One of the reference blocks 2-17*a* is shown at the far end of the shelf 2-16*a*.

Similar packages on the middle and lower shelves have endings with "b" and "c", as pointed out earlier. For instance, the stack of packages 2-22*b* is located on the middle shelf. While the energy wave 2-10*b* in the far left middle shelf applies energy to the components that are in the stack of packages 2-20*b*. The "energy transfer unit" could use inductive, wireless or optical means to power up the components. Each of the components can use a capacitor to store up charge during this energy transfer. The energy transfer provides immediate energy availability while the stored charge can be used by the component to perform some function.

On the lowest shelf, the reference block 2-12*a* is shown on the bottom far left. The antenna 2-9*c* of the local processor uses links 2-11*c* to communicate with each of the components in the stack of packages 2-21*c*. Note that the link 2-11*c* comprises all of the links from all of the components that are within the volume assigned to that cell. Meanwhile, the energy wave 2-18*c* charges up the components in its assigned volume. The reference block 2-17*c* can be used to determine when one of the packages is removed since each package has a component.

FIG. 2*a* also illustrates a customer (shopper, client, etc.) 2-30 pushing a cart 2-31 down the aisle. A box 2-32 is permanently mounted to the cart and can be used to communicate directly with the master processor 2-2 using link 2-33.

FIG. 2*b* illustrates a side view 2-34 of shelves and a portion of the aisle. The cart 2-31 communicates with the reference blocks 2-15*b* and 2-15*c* via box 2-32 using wireless link 2-37*a* and 2-37*c*. The reference blocks can also have a separate transceiver embedded to receive these wireless signals from a cart, if desired. Once received, the signals are transferred via the hardwired paths 2-35 and 2-36 to the stack processor that is coupled to antenna 2-4. The signals are then sent to the master processor.

A side view 2-38 of the cart 2-31 as shown in FIG. 2*c*. The basket of the cart contains three packages 2-41*c*, 2-43*b* and 2-45*a* each with a component 2-42*c*, 2-44*b* and 2-46*a*, respectively. The components communicated wirelessly with the antenna 2-49 of the cart processor using links 2-47. At least one reference block 2-40 is attached to the carriage of the cart. In addition, an RF energy wave 2-48 is shown which energizes the components wirelessly. The frequencies of the links 2-47 and those of 2-48 can be in different frequency bands if operate simultaneously. Otherwise, the links can operate in a daisy chain pattern, each taking a portion of time in a time division system, to either energize or communicate with the components in the basket of the cart 2-31. In addition, other communication techniques can be used to send the information between all links such as TDMA, FDMA, CDMA, OFDM, UWB, WiFi, etc. The box 2-32 also contains another antenna 2-50 that communicates with the master processor 2-2 using link 2-33 as mentioned earlier. The reference block 2-51 contains the cart processor that interfaces with the stack or master processor.

The stack processor communicates to the master processor 2-2 using the link 2-7. The link 2-7 is illustrated as a wireless channel, but in some case as will be shown later, a wired channel could be used. The master processor has access to a database that stores data concerning the details of the network and information concerning the inventory of the components and the component's characteristics (location of component, type of component, manufacturer, serial number, component name, date of manufacture, etc.).

Figure 3:
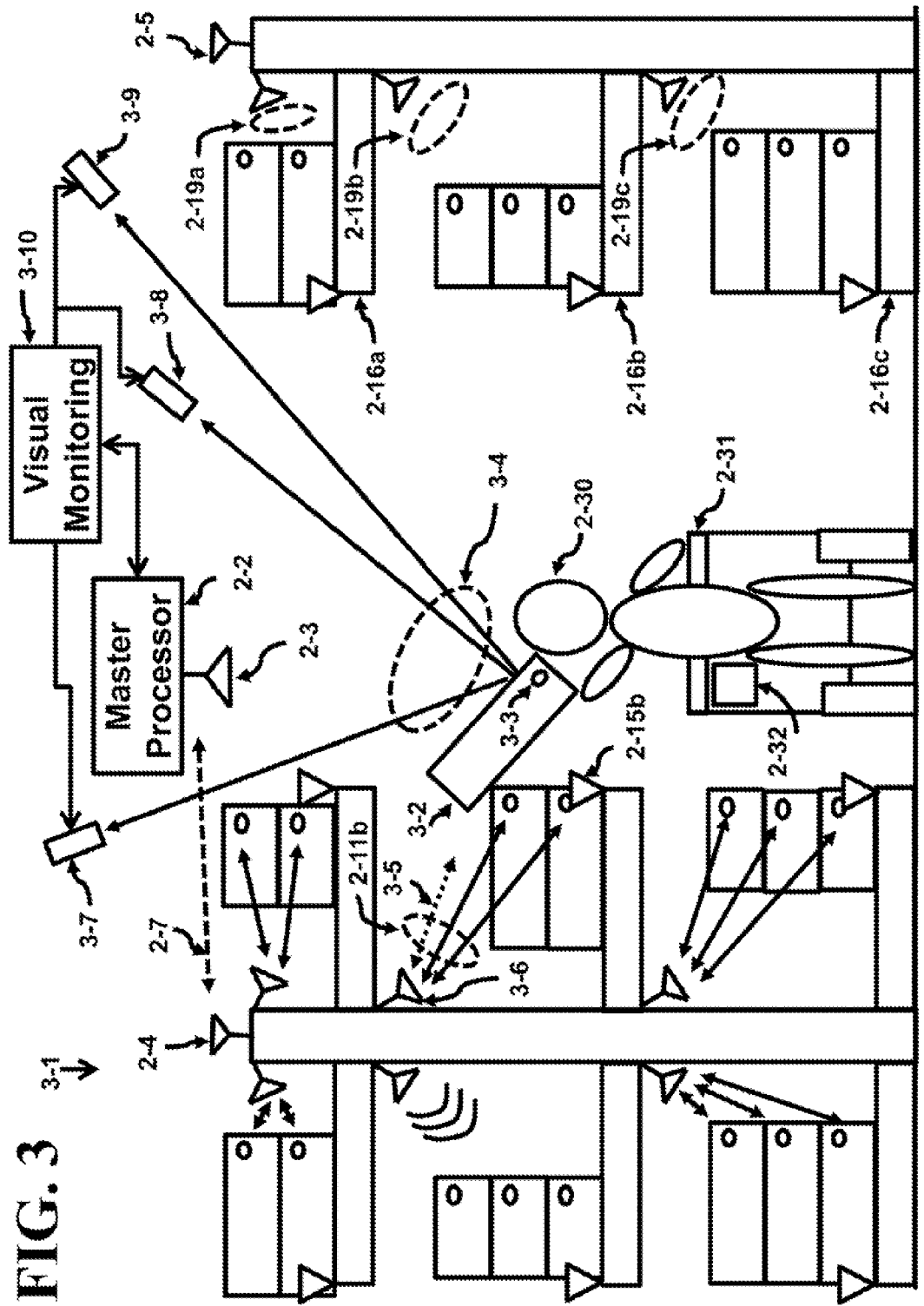
FIG. 3 shows the inventive technique determining where the product is located optically.

A visual link 3-4 is illustrated in the cross sectional view 3-1 of the aisle given in FIG. 3. The customer 2-30 selected the package 3-2 with the component 3-3. The positioning of the component 3-3 is beyond the range of the reference block 2-15*b* and the link 2-11*b* contains a lack of response 3-5 from the antenna 3-6 of the local processor to the component 3-3 or vice versa. This lack of response 3-5 is sensed by the local processor associated with antenna 3-6. This lack of response is transmitted to the stack processor coupled to antenna 2-4.

The stack processor associated with antenna 2-4 of the local processor sends the response to the master process 2-2 via antenna 2-3 of the master processor.

Once the master processor realizes that the package 3-2 is off the shelf, the master processor sends the visual monitoring system 3-10 all the information regarding the package 3-2. This information will be read from the database corresponding to the component 3-3 attached to the package 3-2, that includes the current coordinates (aisle, shelf position, shelf layer) of the package 3-2 within the store. Additional details can also be provided in the database; the cost, when package placed there, weight of package, size of package, etc.

The visual monitoring system 3-10 then issues instructions to cameras 3-7 through 3-9 that are in the vicinity of the package 3-4. These cameras then point to the location that was received from the master processors to help locate the package 3-2. Once the package is visually identified, the cameras can time share the location of this package along with other packages that have been or are being selected by other customers in the store. The location is then sent to the master processor 2-2. After the package 3-2 is placed in the cart 2-31, the visual monitoring system 3-10 issues instructions to the cameras to follow either the package 3-2 or the cart 2-31 as the customer pushes the cart in the store.

Note that the links 2-19a, 2-19b and 2-19c are inactivated or powered down to save power. This occurs since the customer was located by the visual monitoring system on the left side of the aisle. Since the packages on the right side of the aisle are not immediately accessible to the customer (their arms are not that long), there is no need to power up the components on the shelves 2-16a through 2-16c. This can make substantial saving in power costs since power does not have to be applied to all shelves at all times. The powering of the components can match the needs of the flow of customers through the store yet minimizing overall energy usage. As more of the electronics become powered down, the cost saving can be substantial.

Note, that all of the electronic circuit blocks that would be used to carry and insure the integrity of the signal between the components and the master processor are not illustrated, for simplicity of description. For instance, antenna 2-4 or 2-5 of the stack processors do not show any electronic circuits coupled to the antenna. Yet, those skilled in the art would know that transceivers, power supplies, interconnects, microcontrollers, DSP's (Digital Signal Processors), Processors, etc. would be necessary to insure a reliable communication link with a low bit error rate.

Figure 4:
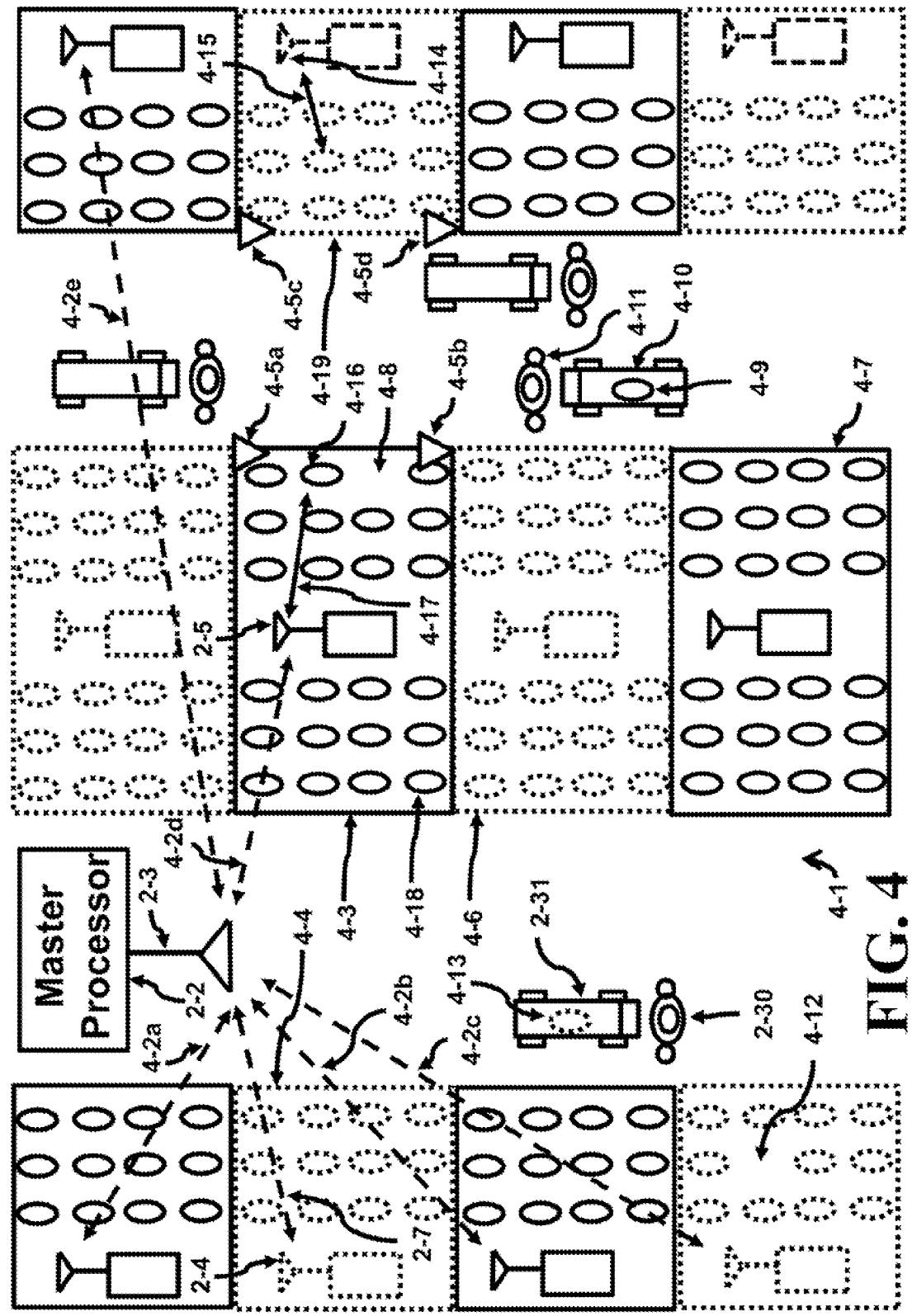
FIG. 4 depicts a top view of the aisles of a store illustrating a wireless connectivity between the master processor and the individual stacks of shelves of this inventive technique.

FIG. 4 depicts a top view 4-1 of FIG. 3 showing two aisles. The customer 2-30 and cart 2-31 are located in the left aisle. The cell 4-3 contains the antenna 2-5 of the local processor while the cell 4-4 contains the antenna 2-4 of the local processor. Both processors were indicated during the discussions of FIG. 3. A customer 4-11 is pushing a cart 4-10 in the right aisle. The master processor 2-2 is coupled to the antenna 2-3 of the master processor. The antenna 2-3 then transfers signals to/from the stack processor 2-5 using link 2-7, as was also shown in FIG. 3. A stack processor would be connected to antenna 2-4, similarly another stack processor would be connected to antenna 2-5 of the local processor. The stack processor interfaces with all the local processors within the underlying shelves of that stack. The stack processors are at the top stack of the shelves and transfer data between the local processors within that stack and the master processor. The antenna 2-4 of the stack processor uses link 2-7 while antenna 2-5 of the stack processor uses link 4-2d. Some later examples show ways to eliminate one of these stack processors in the sequence of transfers between processors. The stack processor 2-5 (in the center row of shelves) then sends the signal to the local processor (not show) which then transfers the signal to/from the selected component 4-16 using link 4-17. The master processor then communicates with all of the remaining stack processors that are within its range to see if there are any additional changes to the other shelves. A few, but not all, of these links 4-2a to 4-2e to the stack processors are depicted.

The local processor has a range that extends to about the edge of the rectangles 4-3 or 4-4. The rectangle 4-4 sweeps out a volume when moved into the page. The depth of this volume is equal to the height of the shelf. This volume is equal to a single aisle cell. In the rectangle 4-3, however, one of these shelves can be accessed by a customer in the left aisle, while the other shelf can be accessed by a customer in the right aisle. A back or barrier partition that can separate the contents between these two shelves can be removed to effectively double the volume of a single aisle cell. The rectangle 4-3 sweeps out a volume when moved into the page. The depth of this volume is equal to the height of the shelf. This volume is equal to a two single aisle cells, since the barrier between these cells has been removed.

The local processor (not shown), which is coupled to the stack processor 2-5, also needs to communicate with all of the components located within its swept out volume or cell. The volume has been described as having a shape of a rectangular solid, but in reality the shape would be more spherical in nature for a single antenna. With a mechanical or electrically steerable antenna, the volume may be able to approach more of a rectangular solid shape. To help determine the edges of the cell defined by the rectangle 4-3, reference blocks 4-5a and 4-5b are shown on only one side to simply the complexity of the diagram although ideally at least one additional reference block should be located on the left side of the rectangle 4-3.

If the component 4-18 within the cell 4-3 is moved beyond the boundaries of the cell, the communication link between the local processor and the component degrades and loses contact. This is how the system knew that the component at the empty location 4-8 of cell 4-3 was missing. This component is being monitored by one of the inventive techniques illustrated earlier. The missing component 4-9 that was in the empty location 4-8 is located in the cart 4-10 being pushed by customer 4-11.

A second rectangle 4-6 (dotted and below rectangle 4-3) highlights the location of a second cell with a second stack processor. The dotted line help distinguish the different cells. Each cell can have a different carrier frequency to form the communication links between the components located within a cell and a local processor. Adjacent cells use different frequency bandwidth to insure less interference from neighboring cells. The rectangles 4-6, 4-7 and 4-19 points out the location of a more cells with their stack processor.

An empty location 4-12 in the cell at the lower left of FIG. 4 was once occupied by component 4-13. The component was removed by the customer 2-30 pushing cart 2-31 carrying the component 4-13 taken from the empty location 4-12.

A local processor (not shown) is in contact with the antenna 4-14 of stack processor and is in a dotted rectangle in the rightmost column. The local processor communicates with the components using link 4-15. The reference blocks 4-5c and 4-5d for the local processor are illustrated at the corners of the cell nearest the aisle where customers pass.

Figure 5:
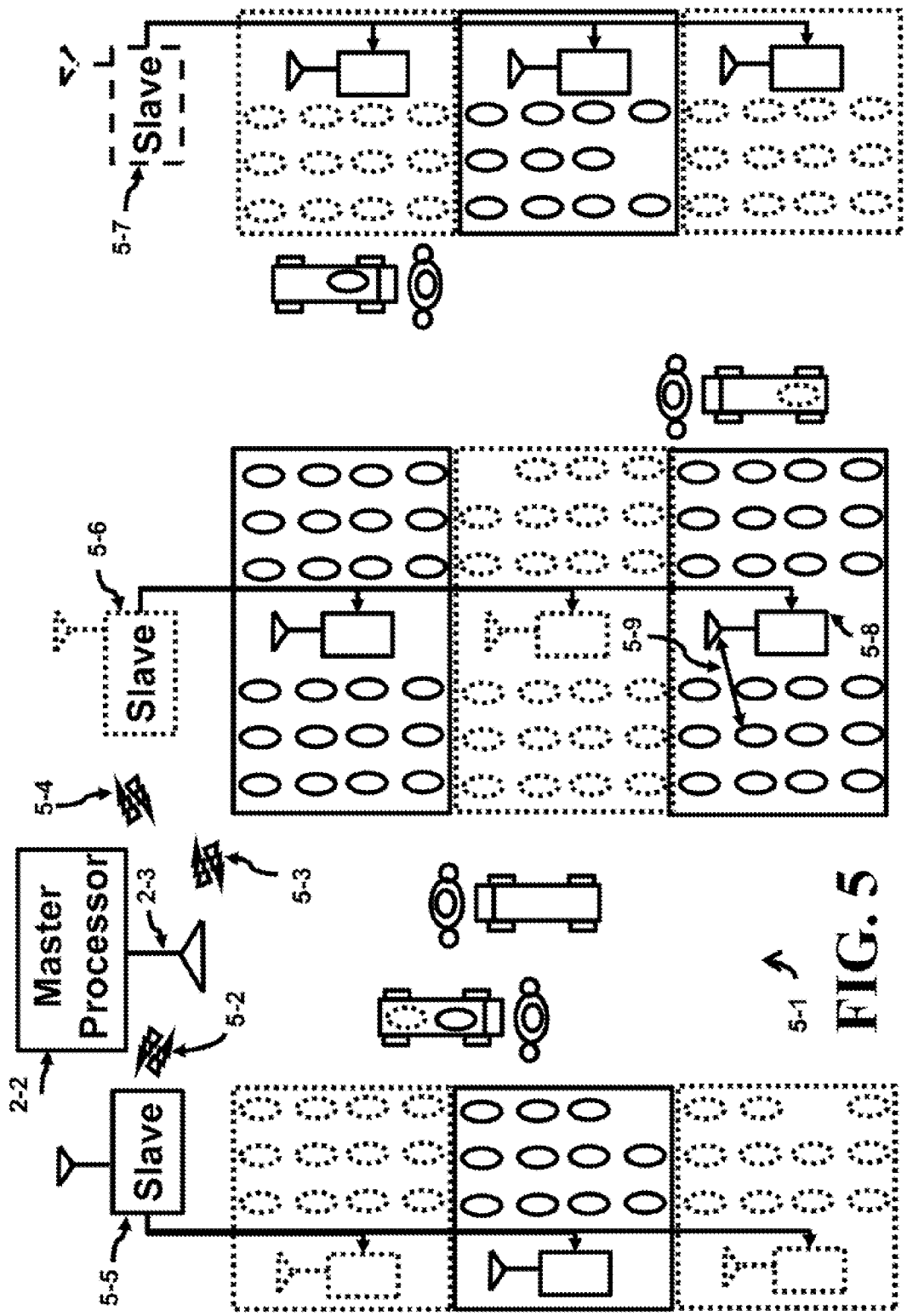
FIG. 5 shows a top view of the aisles of a store illustrating a wireless connectivity between the master processor and a slave processor that is wired to individual stacks of shelves illustrating this inventive technique.

FIG. 5 shows a different architecture 5-1 for transferring the data from the components to the master processor 2-2. The stack processors have been removed and the local processors are wired together in each row of shelves comprising an aisle.

For example, the slave processor 5-5 is wired to the local processors in the left column of shelves. This slave wirelessly sends data to the master processor 2-2 using the link 5-2. The slave processor 5-6, which communicates to the master processor using link 5-3, is wired to all of the local processors in the center colunmn. One of the local processors 5-8 communicates to the components using a wireless link 5-9. The last slave processor 5-7 communicates to the master processor using link 5-4 and is wired to all of the local processors in the right column. The dotted outlines of the slave processors indicates different frequency bands can be used to avoid interference. Note that only one layer of shelves are illustrated in the top view. If additional layers of shelves are used, they can be located below this shelf.

Figure 6:
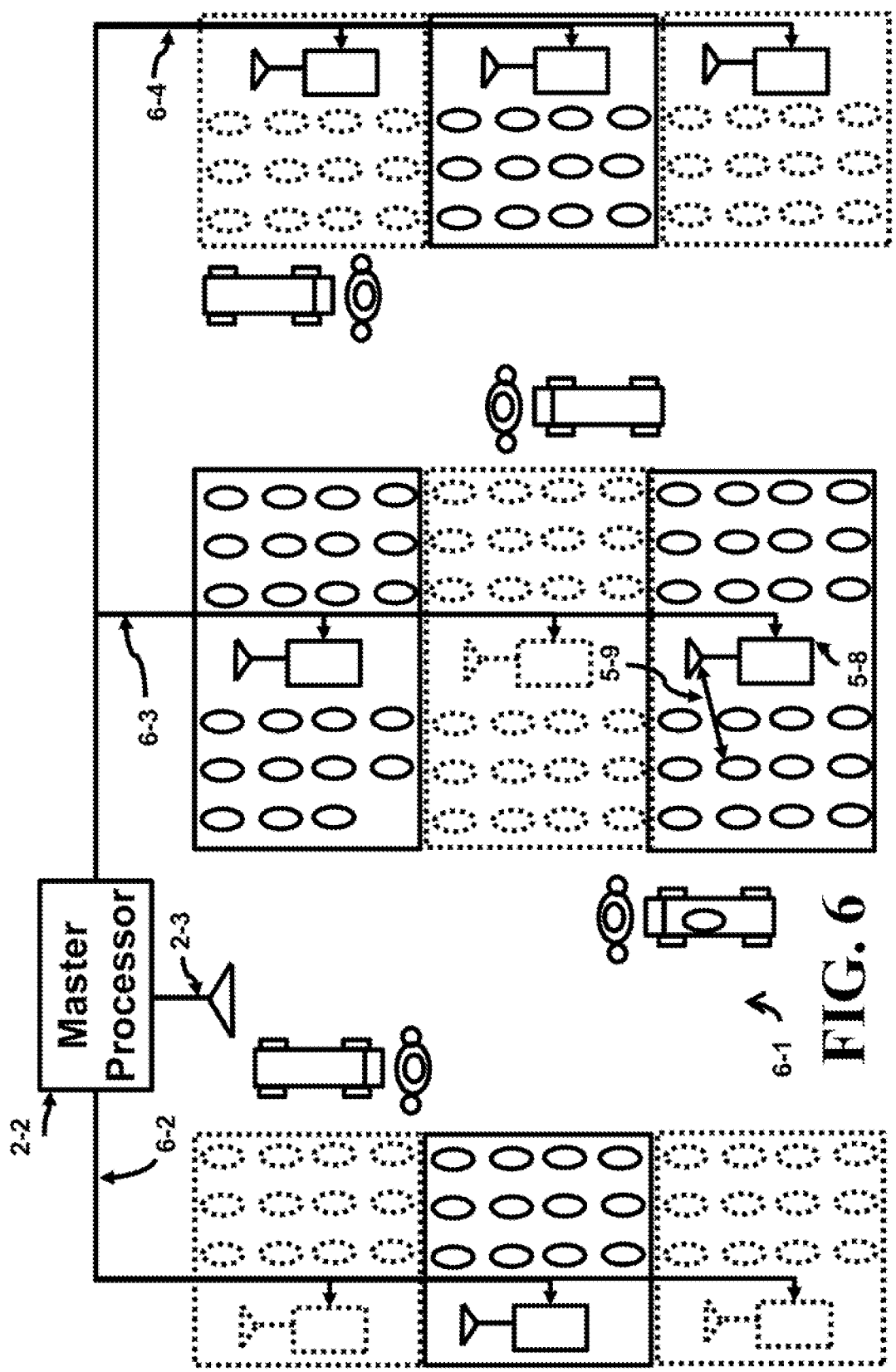
FIG. 6 shows a top view of the aisles of a store illustrating a wired connectivity between the master processor and all slave processors that illustrating this inventive technique.

FIG. 6 depicts another architecture 6-1 where the master processor 2-2 is wired to all local processor using interconnect 6-2, 6-3 and 6-4. The slave processors have been eliminated. The components on the shelves are still wirelessly coupled to their local processor. For example, see local processor 5-8 using wireless link 5-9 to communicate to one of the components.

Figure 7:
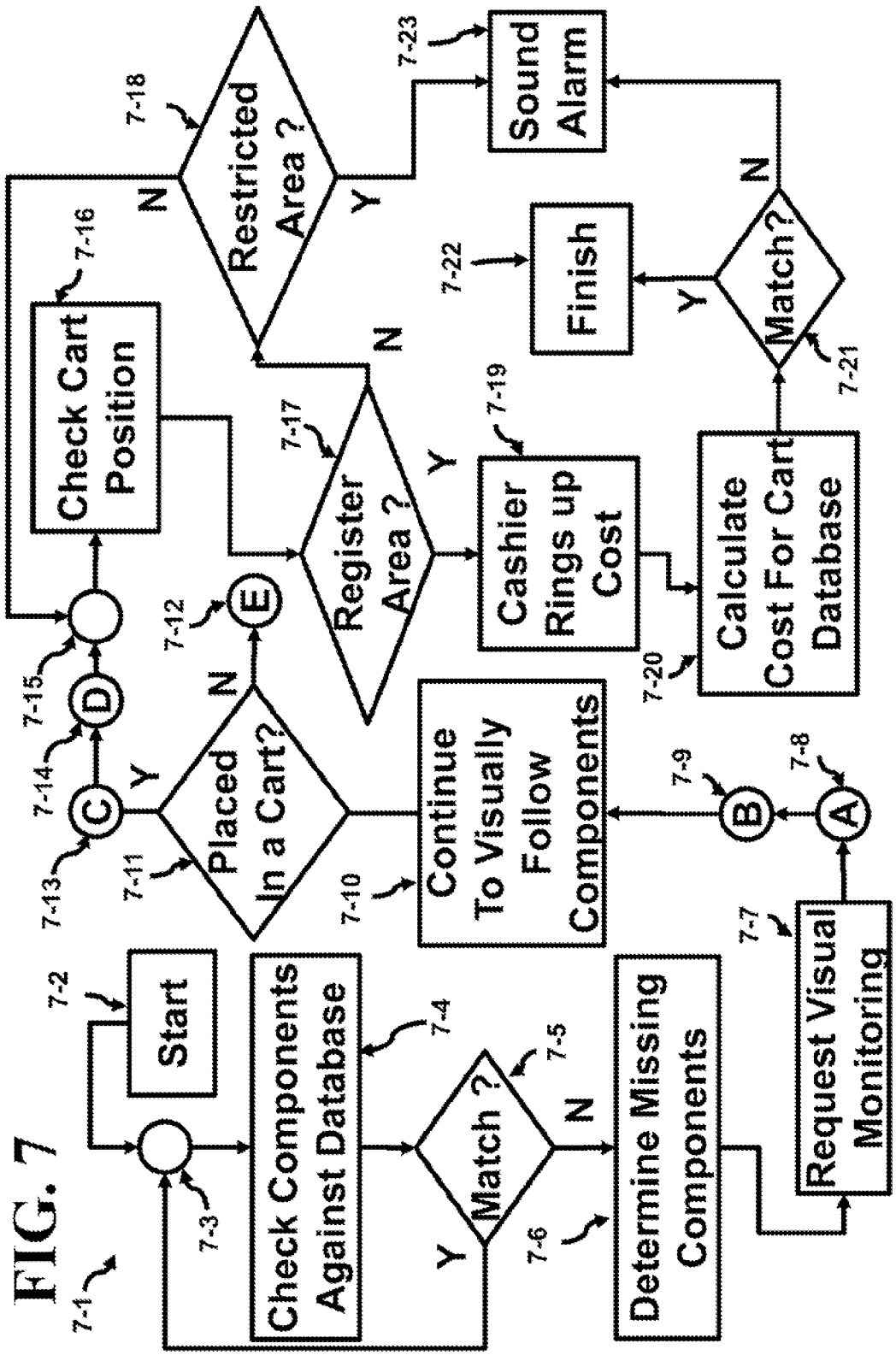
FIG. 7 depicts a flowchart for following components selected from the shelf to either the register or restricted area.

FIG. 7 illustrates a flowchart 7-1 that identifies when the components are removed from a shelf and tracks these components placed in a cart. After start 7-2 and through the joiner 7-3, the components in the cell are checked against a database 7-4. In 7-5, a decision is made to determine if the components match the database. If so, move to joiner 7-3, otherwise move to the block to determine the missing component 7-6. Once the component is identified, the master system request visual monitoring 7-7 to begin.

Figure 8:
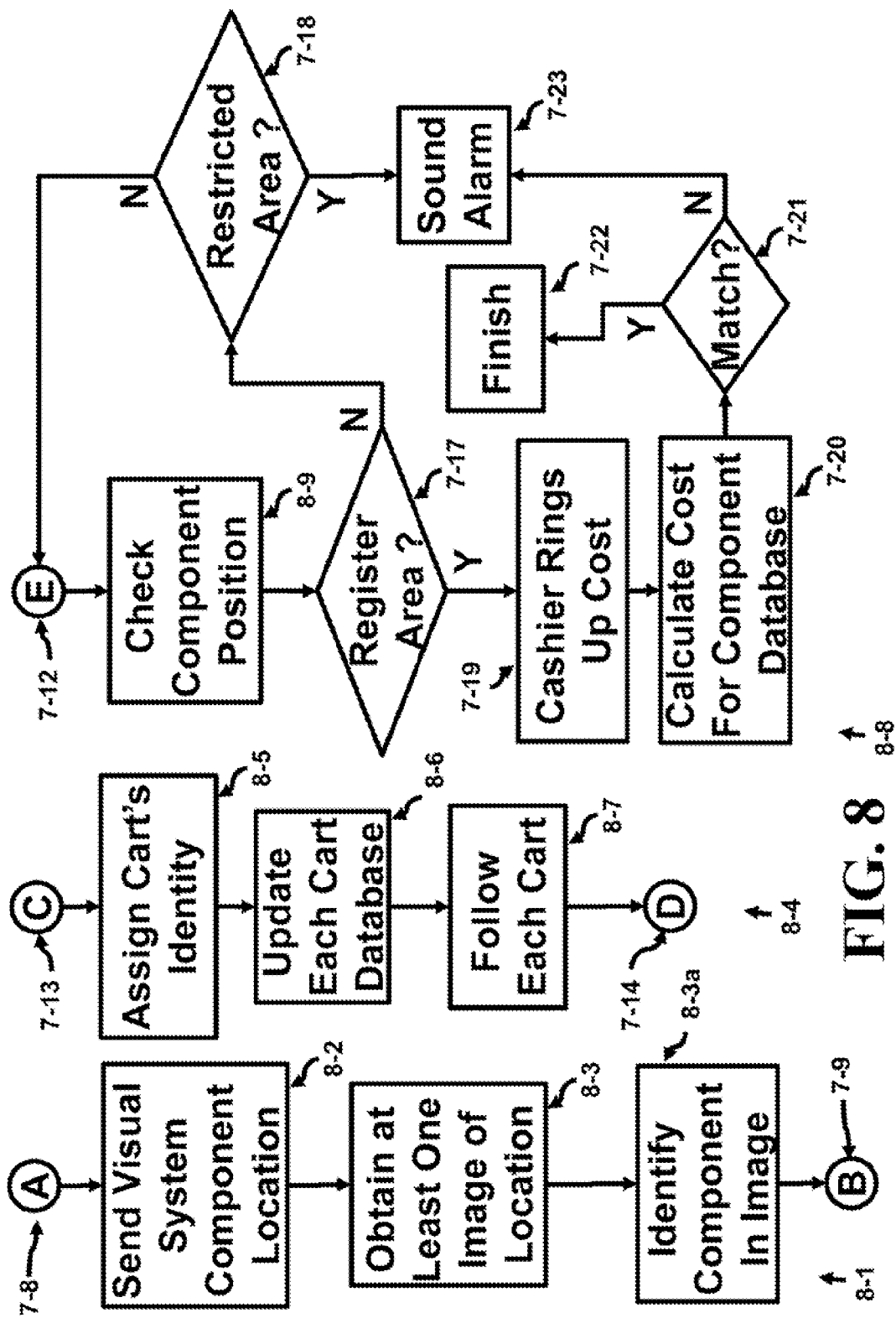
FIG. 8 shows the three different sub-flowcharts embedded in the flowchart of FIG. 7 and FIG. 9.

The next instruction is in the sequence A-B represented by 7-8 and 7-9 which is depicted in flowchart 8-1 shown in FIG. 8. After leaving A 7-8, block 8-2 indicates that information from the master processor regarding the physical location corresponding to the component that was removed is send to the visual system being triggered by the removal of the component from the shelf. The network between the master and local processor for a particular store is a relatively permanent network. Having a permanent network has benefits since the database of each local processor can be tied to a coordinate system based on a building's blueprint overlaying the local processor placement. The master processor asks for details regarding the missing component. Then the local processor indicates its geographical store based location based on the blueprints providing the aisle, the shelf, the level of the shelf, etc.

As an alternative, a second positioning technique known as GPS (Global Positioning Satellite) can also be used to identify the locations of the local processors. Since the local processors are part of a permanent network as pointed out earlier, the local processor can be powered by an actual power supply that plugs into a major power source (the power grid, backup generators, etc.). The GPS circuits can provide geographical global based location that could be mapped onto a blueprint of the store or used directly. This would allow easy changes to the store's appearance yet maintain the system running.

The GPS system can be placed into each component allowing the position of each component to be easily determined. A certain amount of power would be required to energize the component circuits for GPS. An energy transfer unit can be used to provide the components with energy but only at predetermined locations. The cart can provide one location where the component can be energized and read, another is at the register.

Once block 8-2 sends the location to the component to the visual system being triggered by the removal of the component from the shelf. The visual system then directs for the capture of at least one image of the component as in block 8-3. The image is scanned for the component or package, since now the visual system knows the details of the package size from the database. The shape can be determined from these dimensions and the component can be identified by both its shape and position 8-3*a*. The next step is B 7-9 that moves back to the flowchart in FIG. 7.

In block 7-10, the visual system monitors that the component (or package) as the package leaves the shelf. Then, the visual system determines if the component has been placed into the cart 7-11. If the component is not placed in the cart, move to E 7-12 where the flowchart 8-8 is given in FIG. 8, otherwise move to the sequence C-D represented by 7-13 and 7-14 depicted in the flowchart 8-4 in FIG. 8. Starting at C 7-13, the identity of the cart is probed, if a number is already assigned then do nothing. Otherwise, assign a random number to the cart 8-5. As each new component is placed in the cart, the master processor updates the database for that cart as in block 8-6. One way of performing the update is by using the inventive technique illustrated in FIG. 2*b* where the cart communicates wirelessly with the store's network via a stationary terminal such as the reference block which is typically permanently mounted to the shelves. This allows the operation of updating the database in the master processor for the cart as in block 8-6. Finally, in block 8-7, each cart is followed visually. The cart can be monitored by using visual sightings (wireless communications is also possible as shown later). Then move to D 7-14 back in FIG. 7.

The next step is to pass the joiner 7-15 and check the cart's position 7-16. Determine if the cart is in the register area 7-17. If the cart is not in the register area, determine if the cart is in a restricted area 7-18. The restricted area can be a bathroom, the back employee door, the store entrance/exit (if package has not purchased), or tucked into the perpetrator's clothes. If the cart is in the restricted area, then sound off the alarm 7-23, and follow up on the whereabouts of the component. Otherwise, go to the joiner 7-15.

If the cart is in the register area 7-17, then the cashier will ring up the costs 7-19. In addition, the master system calculates the cost based on the database contents of the cart 7-20. The master processor compares the calculated and the rung up costs 7-21. If they do not match, sound the alarm 7-23. Otherwise, if they match, the job is finished 7-22 and then terminated.

In FIG. 7, if the component was not visually placed into the cart 7-11, then the package is being carried by the customer and control then moves to E 7-12 given in FIG. 7 and in FIG. 8 as flowchart 8-8. This flowchart 8-8 is very similar to the last part of FIG. 7 starting from the joiner 7-12. The exception being that the block 7-16 which checks the cart's position has been replaced by the block 8-9 that checks the component's position. Block 8-9 checks the component's position visually to determine if the component is at the register area 7-17. If the component is not in the register area, determine if the component is in a restricted area 7-18. If the component is in the restricted area, then sound off the alarm 7-23, otherwise go to the joiner 7-12.

If the component is in the register area, then the cashier will ring up the costs 7-19. In addition, the master system calculates the cost of the database contents of all carried components brought to the register 7-20. The master processor compares the calculated and the rung up costs 7-21. If they do not match, sound the alarm 7-23. Otherwise, if they match, the job is finished 7-22 and then terminated.

Figure 9:
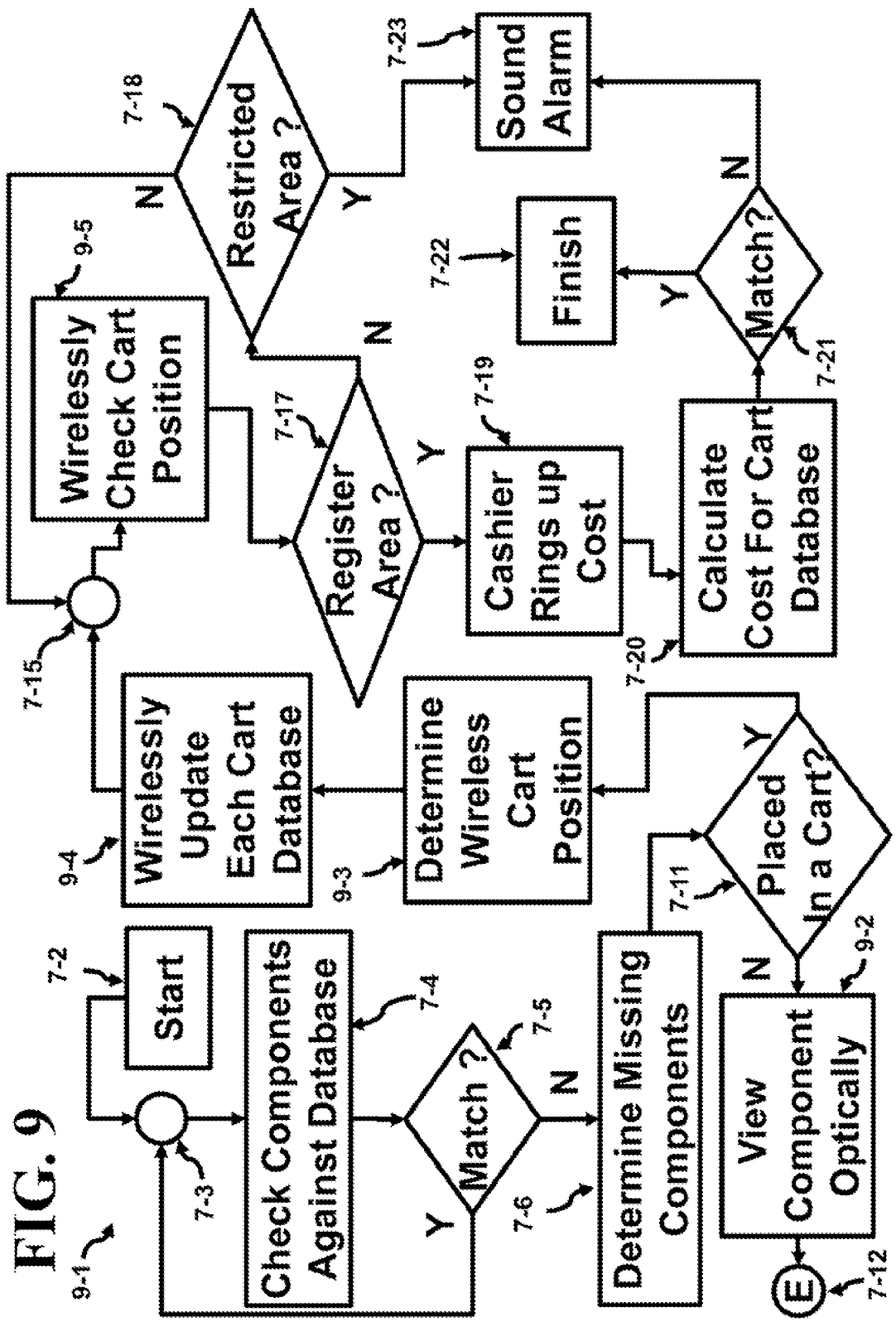
FIG. 9 depicts another flowchart for following components selected from the shelf to either the register or restricted area.

FIG. 9 illustrates a flowchart 9-1 for a wireless tracking system being used for the cart and optically tracking carried components 9-2 by customer. FIG. 9 identifies removed components placed in a cart and wirelessly follows the cart or visually tracks the components carried by the customer. After start 7-2 and through the joiner 7-3, the components in the cell are checked against a database 7-4. In 7-5, a decision is made to determine if the results match the database. If so, move to joiner 7-3, otherwise move to the block to determine the missing component 7-6. Once the component is identified, the master system updates its database and waits till the cart wirelessly responds that the component has been placed in the cart 7-11.

After a certain delay, the visual system is activated to determine where the component currently is located and sends the location of the component to the visual system after a certain delay being triggered by the removal of the component from the shelf. If the component is not placed in the cart and is being carried, continue to view the component visually 9-2 then move to E 7-12 which corresponds to the flowchart 8-8 in FIG. 8. The visual system then directs for the capture of at least one image of the component. The image is scanned for the component, since now the visual system knows the details of the package size from the database. The shape can be determined from these dimensions and the component can be identified by both its shape and followed.

On the other hand, if the component is placed in the cart, the master processor interfaces with the cart processor and makes a request determine cart location 9-3. Then the master processor wirelessly updates the contents of the cart to database 9-4. The network between the master and local processor for a particular store is relatively permanent network. Having a permanent network has benefits since the location of each local processor can be tied to a coordinate system based on a building's blueprint overlaying the local processor placement or GPS signals can be used. When the master processor asks for details regarding the missing component another data point given would be extracted from the local processor indicating its geographical store based location or geographic global based location.

The positioning technique known as GPS (Global Positioning Satellite) can also be used to identify the local processor or the location of the cart. A GPS can be included with the local processor to provide the position. Since the local processors are part of a permanent network as pointed out earlier, the local processor can be powered by an actual power supply that plugs into a major power source (the power grid, backup generators, etc.). Thus, the GPS circuits, being powered, can provide geographical world based location that could be mapped onto a blueprint of the store.

The GPS can be placed into each component and the position of each component can be determined easily. A certain amount of power would be required to energize the circuits for GPS. An energy transfer unit can be used to provide the components with energy but only at pre-determined locations. The cart provides one location where the component can be energized and read, another is at the register.

This flowchart in FIG. 9 starting from the joiner 7-15 is explained. The reference block 9-5 wirelessly checks the cart's position. Next, the cart's position is checked wirelessly to determine if the cart is at the register area 7-17. If the cart is not in the register area, determine if the cart is in a restricted area 7-18. If the cart is in the restricted area, then sound off the alarm 7-23, otherwise go to the joiner 7-15.

If the cart is in the register area, then the cashier will ring up the costs 7-19. In addition, the master system transfers the calculated cost based on the database contents of the components brought to the register 7-20. A match between the calculated and the rung up costs are compared 7-21. If they do not match, sound the alarm 7-23. Otherwise, if they match, the job is completed and then terminated.

Figure 10:
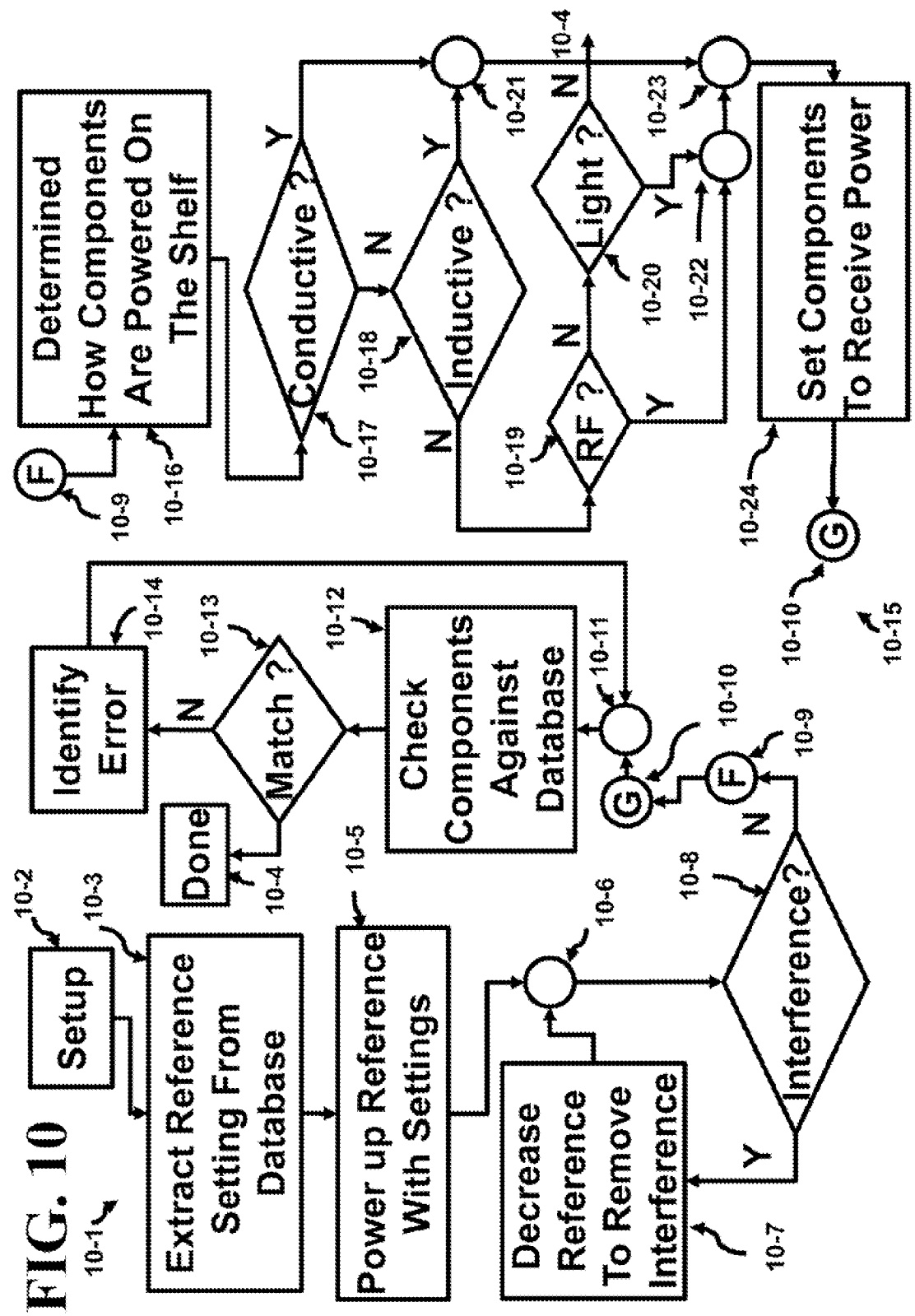
FIG. 10 illustrates one of the power up sequence of this inventive technique.

FIG. 10 depicts the method 10-1 of setting up the reference power setting of the reference block in a cell. Also, a power up procedure is applied to the components on the shelf. The flowchart starts with the setup 10-2 moves to extracting from the database the initial setting of the reference block 10-3. The value of reference power setting is stored in the memory of all reference blocks 10-5. After the joiner 10-6, the system determines if there is interference 10-8. If there is, go to 10-7 and decrease the value stored in memory to reduce the output power of the transceiver and try again. When the interference in communicating to all of the reference blocks is eliminated, apply the values stored in memory to each of the reference blocks. Then move to the joiner 10-6. Repeat the interference 10-8 test, if there is no interference move to the sequence F 10-9 to G 10-10. This sequence is illustrated in the flowchart 10-15 shown on the right.

Typically, the database can be searched to find the power up details. However, the flowchart 10-15 can be used to determine how the components are powered on the shelf 10-16. If the power is conductively transferred 10-17, past through joiners 10-21 and 10-23 and set the components to receive the power 10-24. Then go to G 10-10. If the conductive test 10-17 fails, then see if inductive powering is used 10-18, if not determine if RF 10-19 provides the source of power. Otherwise light 10-20, or laser beams, can be applied to the component's solar cell to convert the light into electricity. If the light test fails, notify the master processor and go to block 10-4 or done.

If inductive powering is used, then continue to 10-24 via 10-21 and 10-23. Similarly, if RF is used, move to 10-24 through 10-22 and 10-23. If light is used, move to 10-24 through 10-22 and 10-23. If the excitation to energize the components functions, a communication signal will be received by the local processor. Once the type of power excitation is determined and applied, move to G 10-10. From G, move to the joiner 10-11.

Now that the components are powered up, all reference blocks should be able to sense the presence of the components in their cell. In fact, some may exceed the boundary into an adjoining cell, but different carrier frequency of ($f_1$, $f_2$, $f_3$ . . . ) can be used to partition the space within the store into cells as pointed out earlier. For example, one cell can have carrier frequencies of $f_1$ and the adjacent cells can have a carrier frequency of $f_2$.

After the joiner 10-11, the components are checked against a database 10-12 to see if all components are accounted for. If not 10-13, identify the error 10-14 and report it to the master processor and return to joiner 10-11. If everything matches, the system moves to done 10-4.

Figure 11:
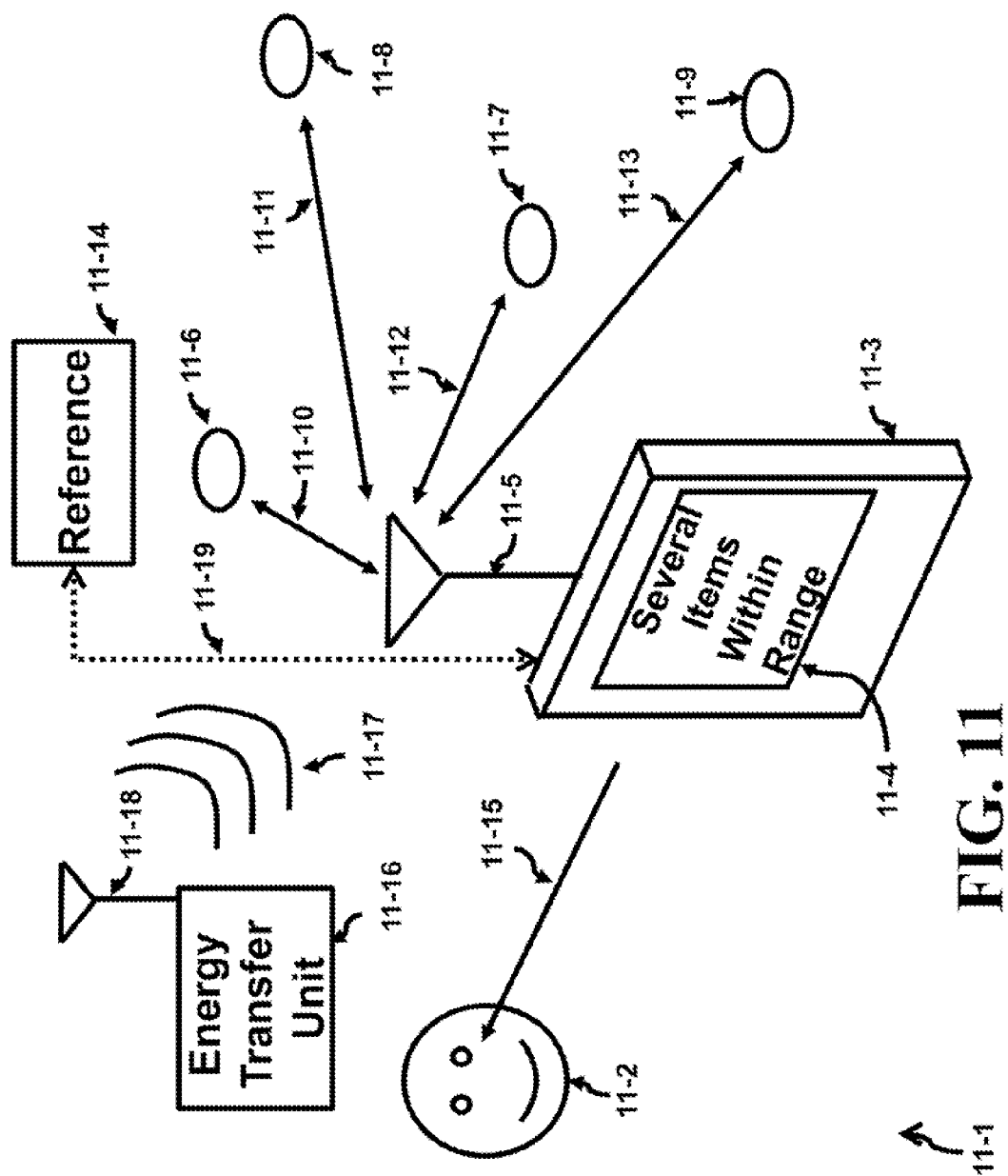
FIG. 11 depicts a handheld locator using the inventive technique.

Another inventive use 11-1 is given in FIG. 11. A handheld unit 11-3 with a display 11-4 indicating that "Several items are within range" is facing a user 11-2 along the sightline 11-15. The handheld unit contains all the electrical parts, integrated circuits, display, processors, antennas, display screens, entry pads, etc, as would be expected by any person skilled in the art in constructing a hand held unit. The display 11-4 can also provide the programmed names of the components. The system 11-16 applies an energy transfer unit to an antenna 11-18 that sends the energy to the components 11-6 through 11-9 via the link 11-17. The energy from the energy transfer unit is picked up and converted into electrical energy. Meanwhile, the components communicate with the handheld unit 11-3 using the antenna 11-5 and the links 11-10 through 11-13.

In this inventive technique, a portable energy transfer unit 11-16 is used to activate the components within range of the charging antenna 11-18 and also within the range of the receiving antenna 11-5 of the hand held unit 11-3. The energy transfer unit 11-16 can potentially be embedded into the hand held unit 11-3. One use of this inventive technique is to find possessions that contain a component in an area. By clicking on the item shown on the screen, a bullet list appears that offers the user a choice of options. One option is to locate the component by causing the component to emit a stimulus. The stimulus can be an audio or visual signal to help locate the unit quicker. For instance, the component can emit a beeping sound. Also, another option is to control the output power of the component. The output power of the component can be adjusted after clicking on it.

The portable hand held unit 11-3 can be used as a game. One player can spread out the components in a certain pattern in an area and then get the second player to follow a path through a maze. The maze can be along the path where the components have the largest output power signatures, for example.

A second inventive technique is to include the reference block 11-14 and the interconnect 11-19. A reference block 11-14 sets the size or volume of the cell. A battery pack can be used to power the reference but a hard wire 11-19 can be used to provide system power from the handheld 11-3.

An apparatus that identifies when a component is removed from a cell comprising; at least one reference block positioned a first distance from a local processor, a boundary of the cell surrounding the local processor is adjusted to align with the first distance and a wireless link is established within the cell to couple the component to the local processor, wherein a loss of the wireless link identifies that the component was removed from the cell. The apparatus further comprising; at least one wall to physically confine the cell, an energy transfer unit that powers the component, or a component's electronics are incorporated in at least one integrated circuit. Wherein the reference block is permanently positioned, the boundary of the cell is adjusted by varying a output power of the reference block, a component's output power is set to the output power of the reference block or a local processor's output power is set to the output power of the reference block.

An apparatus that identifies when a component is removed from a cell comprising; the component programmed with a pre-defined output power level, a boundary of the cell surrounding a local processor is determined by the pre-defined power output level and a wireless link is established within the cell to couple the component to the local processor, wherein a loss of any wireless link identifies that a component was removed from the cell. Further comprising at least one wall to physically confine the cell, an energy transfer unit that powers the component or a component's electronics are incorporated in at least one integrated circuit. Wherein the boundary of the cell is adjusted by varying a output power of the component and a local processor's output power is set to the output power of the component.

An portable hand held system apparatus comprising; at least one component, an energy transfer unit remotely powering the component, a wireless link is formed between the component and the portable hand held unit, an identity of the component is transmitted over the wireless link, a screen displays the identity of the component, the identity of the component is selected on the screen and the selected component emits a stimulus. Wherein the stimulus is audio or visual. Wherein an output power of the component can be adjusted.

A method of notifying a visual monitoring system to follow a component once the component is outside a cell comprising the steps of; using a wireless monitoring system to verify the component is within the cell, wirelessly identifying if the component is removed from the cell and notifying the visual monitoring system to follow the component outside the cell. Further comprising; visually identifying the component is placed in a cart, using a energy transfer unit to power up the component within a cart, using a second wireless monitoring system to verify the component is within a cart and visually identifying the component is being carrried by a customer. Further comprising following the carried component to a register.

Finally, it is understood that the above description are only illustrative of the principles of the current invention. It is understood that the various embodiments of the invention, although different, are not mutually exclusive. In accordance with these principles, those skilled in the art may devise numerous modifications without departing from the spirit and scope of the invention. The techniques presented here to monitor and control theft can be used and applied to customers and employees, alike. In some cases, the reference blocks can be moved and positioned on the fly to adjust the reference distance. Once the volume of the cell is determined, the distances from the transceivers to the edge of the cell can be determined. The processor comprises a CPU (Central Processing Unit), microprocessor, DSP, Network processor, a front end processor, or a co-processor. All of the supporting elements to operate these processors (memory, disks, monitors, keyboards, etc) although not necessarily shown are know by those skilled in the art for the operation of the entire system. Another possibility of monitoring a shelf is to time share the same frequency between a certain number of cells; however, each of these cells will be enabled for a fraction of the time. Otherwise the links can operate in a daisy chain pattern, each taking a portion of time in a time division system, to either energize or communicate with the components in each cell. In addition, other communication techniques can be used to send the information between all links such as TDMA (Time Division Multiple Access), FDMA (Frequency Division Multiple Access), CDMA (Code Division Multiple Access), OFDM (Orthogonal Frequency Division Multiplexing), UWB (Ultra Wide Band), WiFi, etc. Another is that the shelves and supports can be made of a non-magnetic material. Plastic shelves could be one material that could non-magnetic but rigid. This could allow less transceivers to be employed in an isle since the cell or volume surrounding the transceiver is not bounded by a metallic shield. The communication link between the components and the master processor can be created so that the master processor can bypass any processors in the chain and communicate directly with the component. Also, the hardwired system portions can be substituted with wirelessly connected portion or vice versa. In some cases the antenna that is used for communications can also be used as an RF source to power up the components with energy. The store can be replaced with a warehouse to perform the same functions. The customer can also be a warehouse employee.

What is claimed is:

1. A portable hand held system apparatus comprising:
   a plurality of components with different amplitudes of stimulus, placed in a pattern by a first user;
   an energy transfer unit remotely powering the components;
   a wireless link is formed between components and a portable hand held unit;

a list of the components are transmitted over the wireless link;

a touch screen displays the list of the components, whereby selecting one of the components in the list causes a stimulus to be emitted from the component; and a second user can locate the component.

2. The apparatus of claim 1, wherein the stimulus is audio or visual.

3. The apparatus of claim 1, wherein an output power of the component can be adjusted.

4. A method of notifying a visual monitoring system to follow a component once the component is outside a cell comprising the steps of:

using a wireless monitoring system to verify the component is within the cell;

wirelessly identifying if the component is removed from the cell; and notifying the visual monitoring system to continuously follow the component outside the cell.

5. The method of claim 4, further comprising: visually identifying the component is placed in a cart.

6. The method of claim 5, further comprising: using a energy transfer unit to power up the component within the cart.

7. The method of claim 5, further comprising: using a second wireless monitoring system to verify the component is within the cart.

8. The method of claim 4, further comprising: visually identifying the component is being carried by a customer.

9. The method of claim 8, further comprising: following the carried component to a register.

10. The apparatus of claim 8, further comprising: sounding an alarm if the component enters a restricted area.

11. The apparatus of claim 4, further comprising: using a energy transfer unit to power up the component within the cell.

12. The apparatus of claim 4, further comprising: checking the component against a database.

13. The apparatus of claim 5, further comprising: checking the cart position in an aisle.

14. The apparatus of claim 1, further comprising: the second user follows the components that emit stimulus in the pattern.

15. The apparatus of claim 14, wherein the pattern is a maze.

16. The apparatus of claim 14, wherein the components have a larger output power signature.

17. The apparatus of claim 1, wherein the second user follows the components that emit stimulus in either increasing or decreasing order.

18. The apparatus of claim 1, further comprising: a component's electronics are incorporated in at least one integrated circuit.

* * * * *

UNITED STATES PATENT AND TRADEMARK OFFICE
CERTIFICATE OF CORRECTION

PATENT NO. : 8,451,118 B2
APPLICATION NO. : 12/695176
DATED : May 28, 2013
INVENTOR(S) : Quinton Gabara and Thaddeus Gabara It is certified that error appears in the above-identified patent and that said Letters Patent is hereby corrected as shown below:

Title Page
In the Abstract, second sentence, the word "mentoring" should read -- monitoring --:
Next to last sentence, the word "thief" should read -- theft --:

In the Specification
In column 1, line 9, the word "mentoring" should read -- monitoring --:
In column 1, line 16, the word "thief" should read -- theft --:
In column 1, line 30, the word "necessary" should read -- necessarily --:
In column 2, line 5, the word "sequence" should read -- sequences --:
In column 2, line 24, the word "follow" should read -- and follows the --:
In column 3, line 22, the word "block" should read -- blocks --:
In column 4, line 40, the word "weaken" should read -- weakened --:
In column 6, line 32, the word "communicated" should read -- communicate --:
In column 6, line 39, the word "operate" should read -- operated --:
In column 6, line 52, the word "case" should read -- cases --:
In column 7, line 2, the word "process" should read -- processor --:
In column 7, line 12, the word "placed" should read -- was placed --:
In column 7, line 35, the word "yet" should read -- while --:
In column 8, line 32, the word "simply" should read -- simplify --:
In column 8, line 47, the word "line" should read -- lines --:
In column 8, line 52, the word "points" should read -- point --:
In column 8, line 53, the words "a more" should read -- more --:
In column 8, line 59, the word "stack" should read -- a stack --:
In column 9, line 6, the word "columnn" should read -- column --:
In column 9, line 11, the word "indicates" should read -- indicate --:
In column 9, line 29, the word "request" should read -- requests the --:
In column 9, line 35, the word "send" should read -- sent --:
In column 11, line 1, the word "customer" should read -- the customer --:
In column 11, line 9, the word "till" should read -- until --:

Signed and Sealed this
Twenty-eighth Day of January, 2014

Michelle K. Lee
*Deputy Director of the United States Patent and Trademark Office*

CERTIFICATE OF CORRECTION (continued)
U.S. Pat. No. 8,451,118 B2

In column 11, line 27, the word "request determine" should read -- request to determine the --:
In column 11, line 30, the word "relatively" should read -- a relatively --:
In column 11, line 47, the word "location" should read -- locations --:
In column 13, line 42, the word "a" should read -- an --:
In column 13, line 58, the word "a" should read -- an --:
In column 13, line 62, the word "An" should read -- A --:
In column 14, line 11, the words "a energy" should read -- an energy --:
In column 14, line 17, the word "are" should read -- is --:

In the Claims
In column 16, line 6, claim 10, "The apparatus" should read -- The method --:
In column 16, line 8, claim 11, "The apparatus" should read -- The method --:
In column 16, line 11, claim 12, "The apparatus" should read -- The method --:
In column 16, line 13, claim 13, "The apparatus" should read -- The method --.